United States Patent [19]

Christner et al.

[11] Patent Number: 5,748,415
[45] Date of Patent: May 5, 1998

[54] MAGNETORESISTIVE HEAD WITH A MAGNETORESISTIVE FILM SHAPED TO PROVIDE AN IMPROVED READ SENSITIVITY PROFILE

[75] Inventors: Jodie Ann Christner; Earl Albert Cunningham, both of Rochester, Minn.

[73] Assignee: International Business Machines Corporation, Armonk, N.Y.

[21] Appl. No.: 739,240

[22] Filed: Oct. 29, 1996

Related U.S. Application Data

[63] Continuation of Ser. No. 357,478, Dec. 16, 1994, abandoned.

[51] Int. Cl.$^6$ .............................. G11B 5/39; G11B 5/127
[52] U.S. Cl. .............................................................. 360/113
[58] Field of Search ........................... 360/113, 121, 360/123, 110; 324/252; 29/603.07

[56] References Cited

U.S. PATENT DOCUMENTS

| | | | |
|---|---|---|---|
| 3,731,007 | 5/1973 | Masuda et al. | 179/100.2 |
| 4,001,890 | 1/1977 | Kayser | 360/121 |
| 4,142,218 | 2/1979 | Gorter | 360/113 |
| 4,556,925 | 12/1985 | Suenaga et al. | 360/113 |
| 4,649,447 | 3/1987 | Huang et al. | 360/113 |
| 4,700,252 | 10/1987 | Muraoka et al. | 360/113 |
| 4,821,133 | 4/1989 | Mowry et al. | 360/113 |
| 4,843,505 | 6/1989 | Mowry | 360/113 |
| 4,956,736 | 9/1990 | Smith | 360/113 |
| 4,967,298 | 10/1990 | Mowry | 360/113 |
| 5,206,774 | 4/1993 | Blakeslee et al. | 360/113 |

FOREIGN PATENT DOCUMENTS

| | | |
|---|---|---|
| 52-60607 | 5/1977 | Japan . |
| 58-45619A | 3/1983 | Japan . |
| 60-18811A | 1/1985 | Japan . |
| 60-55507A | 3/1985 | Japan . |
| 60-133518 | 7/1985 | Japan . |
| 61-170918 | 8/1986 | Japan . |
| 63-108521 | 5/1988 | Japan . |
| 63-285718 | 11/1988 | Japan . |
| 1315016 | 12/1989 | Japan . |
| 3189914 | 8/1991 | Japan . |

OTHER PUBLICATIONS

Japanese Published Unexamined Patent Application 2-246007, Oct. 1, 1990, pp. 35-37; and its English language abstract.

Japanese Published Unexamined Patent Application 56-7223, Jan. 24, 1981, pp. 137-141; and its English language abstract.

(List continued on next page.)

*Primary Examiner*—Stuart S. Levy
*Assistant Examiner*—Kevin M. Watkins
*Attorney, Agent, or Firm*—Matthew J. Bussan

[57] ABSTRACT

A magnetoresistive (MR) head includes an MR film that has a bottom edge to be positioned adjacent to a magnetic medium, a first side with a first outside edge, and a second side with a second outside edge. The first outside edge extends in a direction that forms an obtuse angle with the bottom edge. A first lead layer is electrically connected to the magnetoresistive film at the first outside edge, and a second lead layer is electrically connected to the magnetoresistive film at the second outside edge. Because of the orientation of the first outside edge of the MR film, magnetic flux from the magnetic medium is more likely to propagate through the MR film without being impeded by the first outside edge, and thus the read sensitivity profile of the MR head is improved. In a preferred embodiment, the first and the second outside edges of the MR film both include a lower portion substantially perpendicular to the bottom edge and an upper portion extending in a direction that forms an obtuse angle with the bottom edge. This minimizes variation in the width of the MR film due to lapping height tolerance because the lower portions of the first and second outside edges are parallel to one another. In another preferred embodiment, the height of the MR film narrows from the second outside edge to the first outside edge. This further improves the read sensitivity profile of the MR head.

14 Claims, 10 Drawing Sheets

OTHER PUBLICATIONS

IBM Technical Disclosure Bulletin, E.A. Cummingham, "Magneto–Resistive Head Design for More Uniformity of Sensitivity and Asymmetry", vol. 37, No. 02A, Feb. 1994, p. 23.

IBM Technical Disclosure Bulletin, G. Bate et al., "Magnetoresistive Read Heads", vol. 17, No. 4, Sep. 1974, pp. 967–968.

IBM Technical disclosure Bulletin, F.C. Hayter et al., "Long–Life Magnetoresistive Head", vol. 24, No. 6, Nov. 1981, p. 2977.

IBM Technical Disclosure Bulletin, "Magnetoresistive Head Noise Cancellation", G. A. Daughenbaugh et al., vol. 19, No. 12, May 1977, p. 4510.

IBM Technical Disclosure Bulletin, "Field–Oriented Magnetoresistive Head", W. McCormick, vol. 22, No. 9, Feb. 1980, p. 4200.

IBM Technical Disclosure Bulletin, "Pseudo–Hall Head Designs", G. Bate et al. vol. 17, No. 12, May 1975, pp. 3761–3764.

MAGNETORESISTIVE HEAD WITH A MAGNETORESISTIVE FILM SHAPED TO PROVIDE AN IMPROVED READ SENSITIVITY PROFILE

This is a continuation of application Ser. No. 08/357,478, filed Dec. 16, 1994, now abandoned.

BACKGROUND OF THE INVENTION

1. Field of the Invention

The present invention relates to magnetoresistive "MR" heads and, more particularly, to an MR head with an MR film shaped to provide an improved read sensitivity profile.

2. Description of the Related Art

MR heads, which often include both an MR read element and an inductive write element, are increasingly popular for recording and reading data stored in a magnetic medium. A primary advantage of MR heads is that they permit an increase in the bit density of magnetic recording systems.

FIG. 1 is a bottom view of the active surface of a conventional MR head 20, i.e., as viewed from a magnetic medium, and FIG. 2 is a sectional view thereof along line II—II in FIG. 1. An MR element 21 is sandwiched between a magnetic shield layer 22 and a magnetic shield/write pole layer 24.

Although not shown, the MR element 21 has a tri-layered structure, i.e., a soft adjacent layer, an intermediate film deposited on the soft adjacent layer, and an MR film deposited on the intermediate film. The soft adjacent layer is made of a soft magnetic material such as PERMALLOY, CoZrMo and the like. The intermediate film is made of a nonmagnetic material such as Ti, $SiO_2$ and the like. The MR film is made of a magnetoresistive material such as NiFe. The soft adjacent layer provides transverse magnetic biasing in the MR film via a biasing current flowing longitudinally through MR element 21. Longitudinal magnetic biasing of the MR film is provided by hard bias magnet layers 26 and 28, which abut against opposite side edges of MR element 21 and are made of an electrically conductive and magnetically hard material such as a cobalt alloy, e.g., CoPtCr.

Hard bias magnet layers 26 and 28 and MR element 21 are each deposited on an insulating layer 30, which is deposited on magnetic shield layer 22. Magnetic shield layer 22 is made of a magnetically soft and physically hard material such as CoHfNb. Lead layers 32 and 34 are respectively deposited on hard bias magnet layers 26 and 28. Lead layers 32 and 34 are made of an electrically conductive material, and are electrically connected to opposite side edges of MR element 21 via hard bias magnet layers 26 and 28, respectively.

An insulating layer 36 is deposited on lead layers 32 and 34 and MR element 21, and magnetic shield/write pole layer 24 made of PERMALLOY or other suitable material is deposited thereover. A write pole layer 38 made of PERMALLOY or other suitable material is deposited over magnetic shield/write pole layer 24, with an insulating layer 40 deposited therebetween.

Magnetic shield/write pole layer 24 and write pole layer 38 are magnetically coupled at a rear portion (not shown) to form a flux path of an inductive write element. A write coil (not shown) is formed through magnetic shield/write pole layer 24 and write pole layer 38. Accordingly, insulating layer 40 forms a write gap for writing information to a magnetic medium when current is applied to the write coil. The MR element 21 is used for reading information from the magnetic medium based on a so-called MR effect, wherein the MR film changes its resistance depending on its angle of magnetization.

Write pole layer 38 has a center line 42, which is offset from a center line 44 of MR element 21 to compensate for a skew in a rotary actuator, for example. The conventional MR head 20 is of the write wide/read narrow type, i.e., the tracks written onto the magnetic medium are wider than the tracks read. This occurs because write pole layer 38 has a width greater than the width MRW (shown in FIG. 2) of MR element 21.

A problem encountered when using conventional MR heads is their nonuniform read sensitivity across a track written onto a magnetic medium.

FIG. 3 shows a read sensitivity profile of the conventional MR head 20 as a solid line and a trapezoidal-fit thereof as a dotted line. In FIG. 3, read sensitivity is plotted versus position along the width MRW of MR element 21 and beyond. The total width across the read sensitivity profile is larger than the width MRW of MR element 21 because of a small read sensitivity off each side edge of the MR element 21. In FIG. 3, the total width across the trapezoidal-fit of the read sensitivity profile is divided into a flat top region A, a right slant region B and a left slant region C.

Flat top region A is a relatively small region of uniform sensitivity. Right slant region B is a little wider than flat top region A and has a steep slope. Left slant region C is large, i.e., about 60% of the total width across the trapezoidal-fit of the read sensitivity profile, and has a gradual slope. Ideally, the right and left slant regions B and C of the read sensitivity curve for an MR head would be nearly vertical, and flat top region A would be wide.

Accordingly, when the conventional MR head 20 is used to read data from a track recorded on the magnetic medium, the long and slow rise of the left slant region C reduces the on-track signal and picks up interference from an adjacent track which competes with the on-track signal. Likewise, when the conventional MR head 20 is used in sector servo applications, the asymmetry between the long and slow rise of the left slant region C and the short and steep fall of the right slant region B produces non-linearities in the position error signal (PES), which cause errors in head positioning and problems with servo gain variation.

Thus, there is a need for an MR head with an improved read sensitivity profile.

SUMMARY OF THE INVENTION

In accordance with a first aspect of the present invention, an MR head includes an MR film that has a bottom edge to be positioned adjacent to a magnetic medium, a first side with a first outside edge extending in a direction that forms an obtuse angle with the bottom edge, and a second side with a second outside edge substantially perpendicular to the bottom edge. A first lead layer is electrically connected to the magnetoresistive film at the first outside edge, and a second lead layer is electrically connected to the magnetoresistive film at the second outside edge.

Because the first outside edge of the MR film in accordance with the first aspect of the present invention extends in a direction that forms an obtuse angle with the bottom edge, magnetic flux from the magnetic medium is more likely to propagate through the MR film without being impeded by the first outside edge, and thus the read sensitivity profile of the MR head is improved.

In accordance with a second aspect of the present invention, an MR head includes an MR film that has a bottom edge to be positioned adjacent to a magnetic medium, a first side with a first outside edge, and a second side with a second outside edge. The first outside edge has a lower portion substantially perpendicular to the bottom edge and an upper portion extending in a direction that forms an obtuse angle with the bottom edge. A first lead layer is electrically connected to the magnetoresistive film at the first outside edge, and a second lead layer is electrically connected to the magnetoresistive film at the second outside edge.

Because the upper portion of the first outside edge of the MR film in accordance with the second aspect of the present invention extends in a direction that forms an obtuse angle with the bottom edge, magnetic flux from the magnetic medium is more likely to propagate through the MR film without being impeded by the upper portion of the first outside edge, and thus the read sensitivity profile of the MR head is improved.

In a preferred embodiment in accordance with the second aspect of the present invention, the second outside edge of the MR film has a lower portion substantially perpendicular to the bottom edge and an upper portion extending in a direction that forms an obtuse angle with the bottom edge. Variation in the width of the MR film due to lapping tolerance is minimized because the lower portion of each of the first and second outside edges of the MR film is substantially perpendicular to the bottom edge.

In another preferred embodiment in accordance with the second aspect of the present invention, the height of the MR film between the bottom edge and a top edge narrows from the second outside edge to the first outside edge. This causes the first side of the MR film to become more sensitive relative to the second side, and thus makes the read sensitivity profile more symmetric.

In accordance with third and fourth aspects of the present invention, an MR head according to the first and second aspects of the present invention, respectively, is operatively connected to an actuator of a direct access storage device (DASD). The DASD also includes a housing and a disk mounted in the housing for rotation about an axis. A surface of the disk has a plurality of data tracks arrayed in a pattern around the axis, and the actuator moves the MR head relative to the surface of said disk.

In accordance with a fifth aspect of the present invention, a method of fabricating a magnetoresistive head includes the steps of: (a) depositing a magnetoresistive film over a first portion of an insulation layer so that the magnetoresistive film has a bottom edge to be positioned adjacent to a magnetic medium, a first side with a first outside edge extending in a direction that forms an obtuse angle with the bottom edge, and a second side with a second outside edge substantially perpendicular to the bottom edge; (b) depositing a first hard bias magnet layer over a second portion of the insulation layer so that a side edge of the first hard bias magnet layer abuts against the first outside edge of the magnetoresistive film; (c) depositing a first lead layer over the first hard bias magnet layer so that the first lead layer is electrically connected to the magnetoresistive film through the first hard bias magnet layer; (d) depositing a second hard bias magnet layer over a third portion of the insulation layer so that a side edge of the second hard bias magnet layer abuts against the second outside edge of the magnetoresistive film; and (e) depositing a second lead layer over a portion of the second hard bias magnet layer so that the second lead layer is electrically connected to the magnetoresistive film through the second hard bias magnet layer.

In accordance with a sixth aspect of the present invention, a method of fabricating a magnetoresistive head includes the steps of: (a) depositing a magnetoresistive film over a first portion of an insulation layer so that the magnetoresistive film has a bottom edge to be positioned adjacent to a magnetic medium, and a first side with a first outside edge, and second side with a second outside edge, wherein the first outside edge has a first portion substantially perpendicular to the bottom edge and a second portion extending in a direction that forms an obtuse angle with the bottom edge; (b) depositing a first hard bias magnet layer over a second portion of the insulation layer so that a side edge of the first hard bias magnet layer abuts against the first outside edge of the magnetoresistive film; (c) depositing a first lead layer over the first hard bias magnet layer so that the first lead layer is electrically connected to the magnetoresistive film through the first hard bias magnet layer; (d) depositing a second hard bias magnet layer over a third portion of the insulation layer so that a side edge of the second hard bias magnet layer abuts against the second outside edge of the magnetoresistive film; and (e) depositing a second lead layer over the second hard bias magnet layer so that the second lead layer is electrically connected to magnetoresistive film through the second hard bias magnet layer.

BRIEF DESCRIPTION OF THE DRAWINGS

The present invention will be described in greater detail with reference to the drawings. In the drawings like numerals refer to like elements.

DESCRIPTION OF THE PREFERRED EMBODIMENTS

Figure 1:
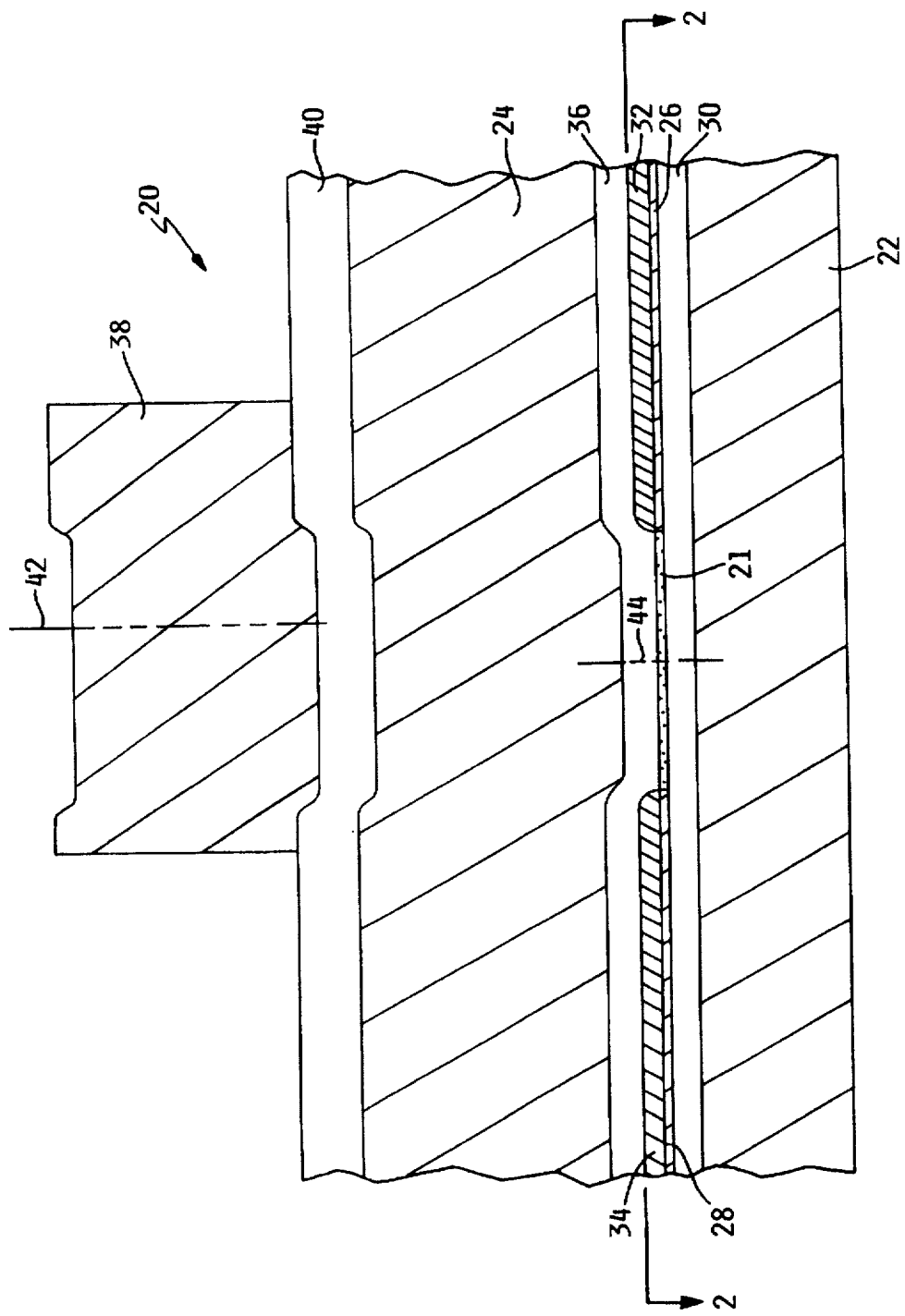
FIG. 1 is a bottom view of a conventional MR head.
Figure 2:
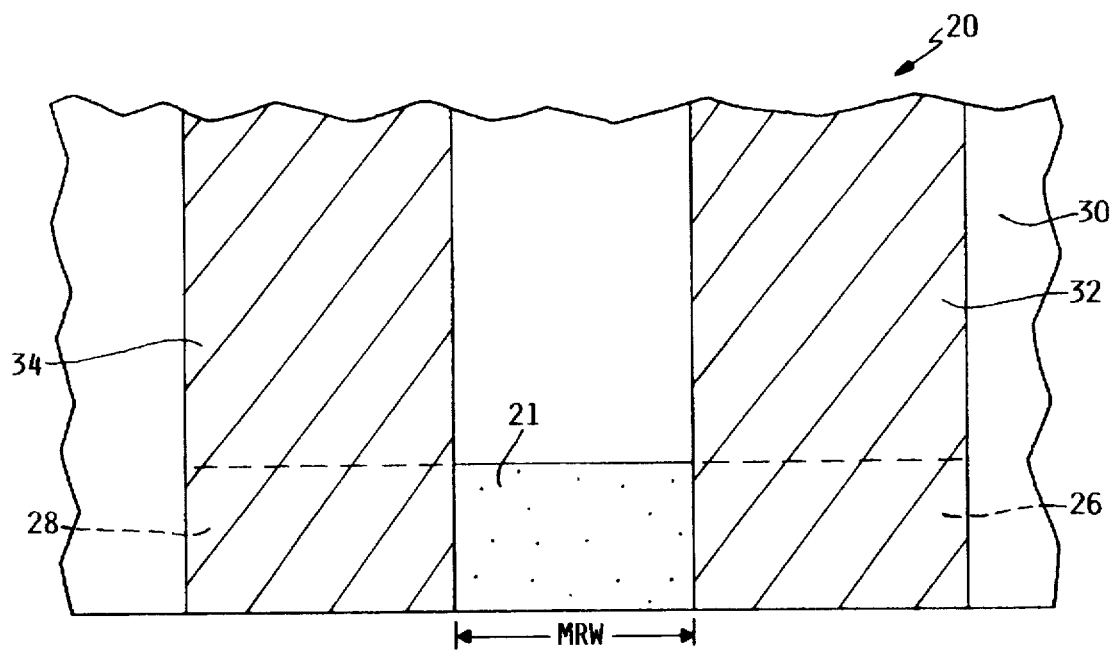
FIG. 2 is a section view of the conventional MR head along line II—II in FIG. 1.
Figure 4:
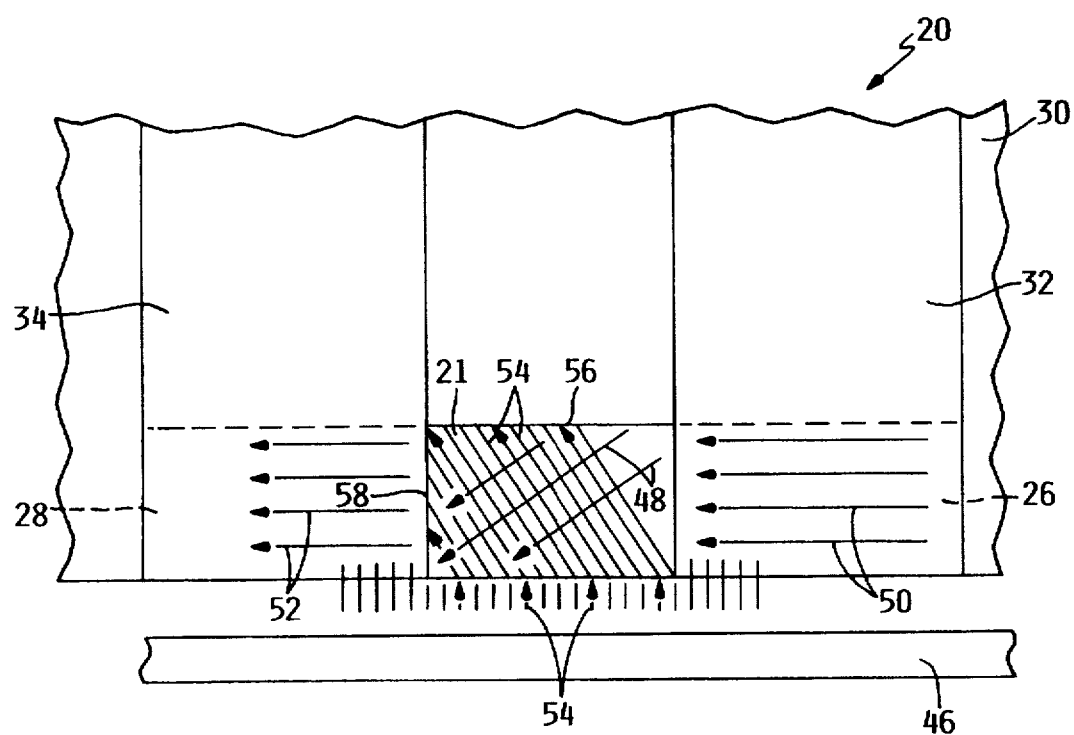
FIG. 4 is a sectional view of the conventional MR head along line II—II in FIG. 1 and shows the magnetic flux propagation.

With reference to FIG. 4, a description of the source of the nonuniform read sensitivity of conventional MR heads is helpful in understanding the present invention. FIG. 4 is a sectional view of the conventional MR head 20 shown in FIG. 2, but also shows the propagation of magnetic flux from a magnetic medium 46 and through conventional MR head 20. A net bias angle of the magnetization of MR element 21 is represented in FIG. 4 as a series of vectors 48 pointing downward and to the left. The net bias angle is a combination of the longitudinal magnetic biasing provided by hard bias magnet layers 26 and 28 and the transverse magnetic biasing provided by the soft adjacent layer (not shown) of MR element 21 via a biasing current flowing longitudinally through MR element 21. The longitudinal magnetic biasing provided by hard bias magnet layers 26 and 28 are respectively represented by vectors 50 and 52 pointing to the left in FIG. 4. Although not shown, the transverse magnetic biasing provided by the soft adjacent layer of MR element 21 is pointed downward in FIG. 4. The magnetic flux from magnetic medium 46 is represented in FIG. 4 by a series of vectors and lines 54 which initially point upward until entering MR element 21 and then point upward and to the left. As shown in FIG. 4, the magnetic flux from magnetic medium 46 propagates within MR element 21 generally in a direction that is perpendicular to the net bias angle.

Figure 3:
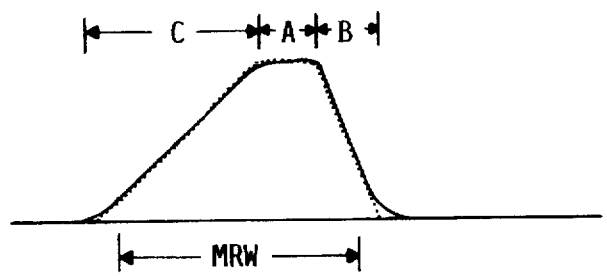
FIG. 3 is a graph showing a read sensitivity profile for the conventional MR head of FIGS. 1 and 2 as a solid line and the trapezoidal-fit thereof as a dotted line.

The magnetic flux entering on the right side (as viewed in FIG. 4) of MR element 21 can propagate all the way to a top edge 56 of MR element 21 and thus influences the resistance of a significant area of MR element 21. However, the magnetic flux entering on the left side of MR element 21 is stopped by an outside edge 58 of MR element 21 and thus influences the resistance of a smaller area of the MR element 21 than does the magnetic flux entering on the right side thereof. Thus the reluctance for the magnetic flux entering at the left side is higher than for the magnetic flux entering at the right side, and less magnetic flux will enter at the left side than will enter at the right side. Even if the same amount of magnetic flux entered on the left side as on the right side, there would be less resistance change on the left side than on the right side because the resistance change depends on how far the magnetic flux propagates toward top edge 56. This is why the left slant region C of the read sensitivity profile shown in FIG. 3 is wide and has a gradual slope.

According to one aspect of the present invention, the MR film is shaped so that magnetic flux can propagate all the way to a top edge of the MR film without being stopped by an outside edge of the MR film, regardless of where the magnetic flux enters along the bottom edge of the MR film. As a result, the read sensitivity profile is improved as compared to that of the conventional MR head 20.

Figure 5:
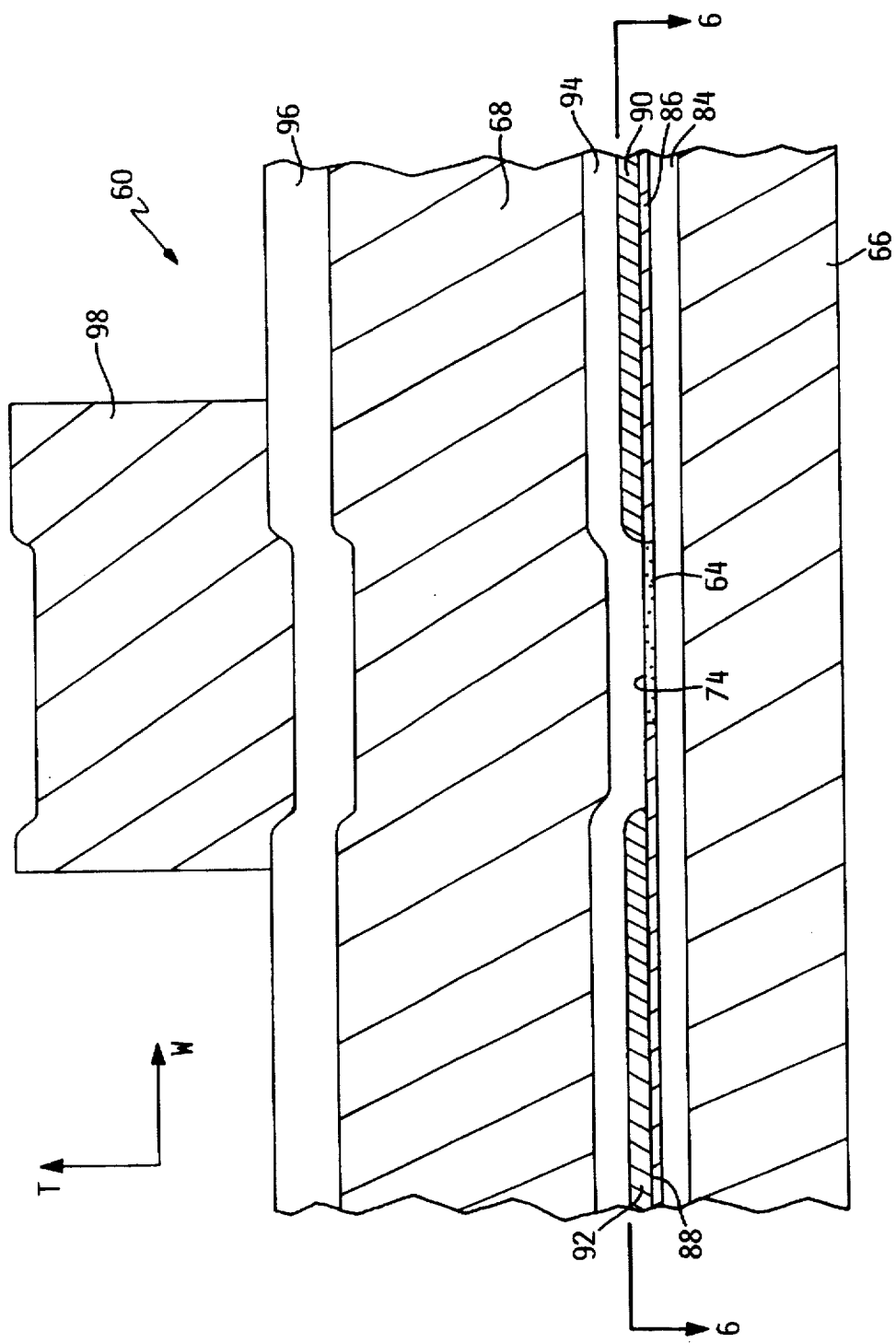
FIG. 5 is a bottom view of an MR head according to a first embodiment of the present invention.
Figure 6:
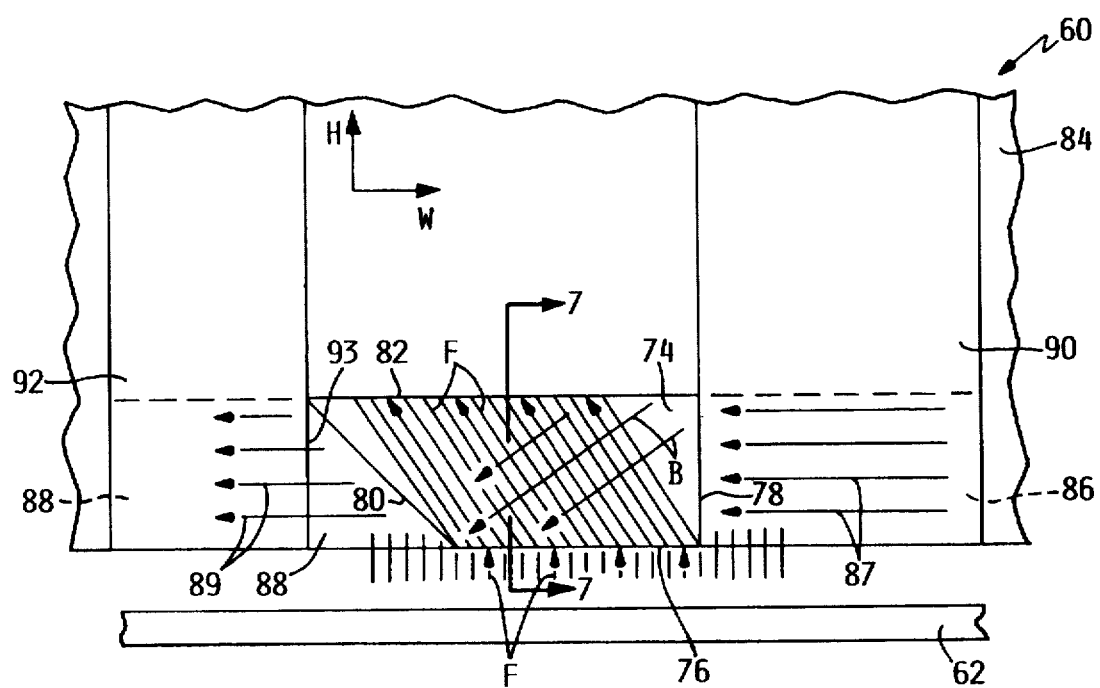
FIG. 6 is a sectional view of the MR head of the first embodiment of the present invention along line VI—VI in FIG. 5.
Figure 7:
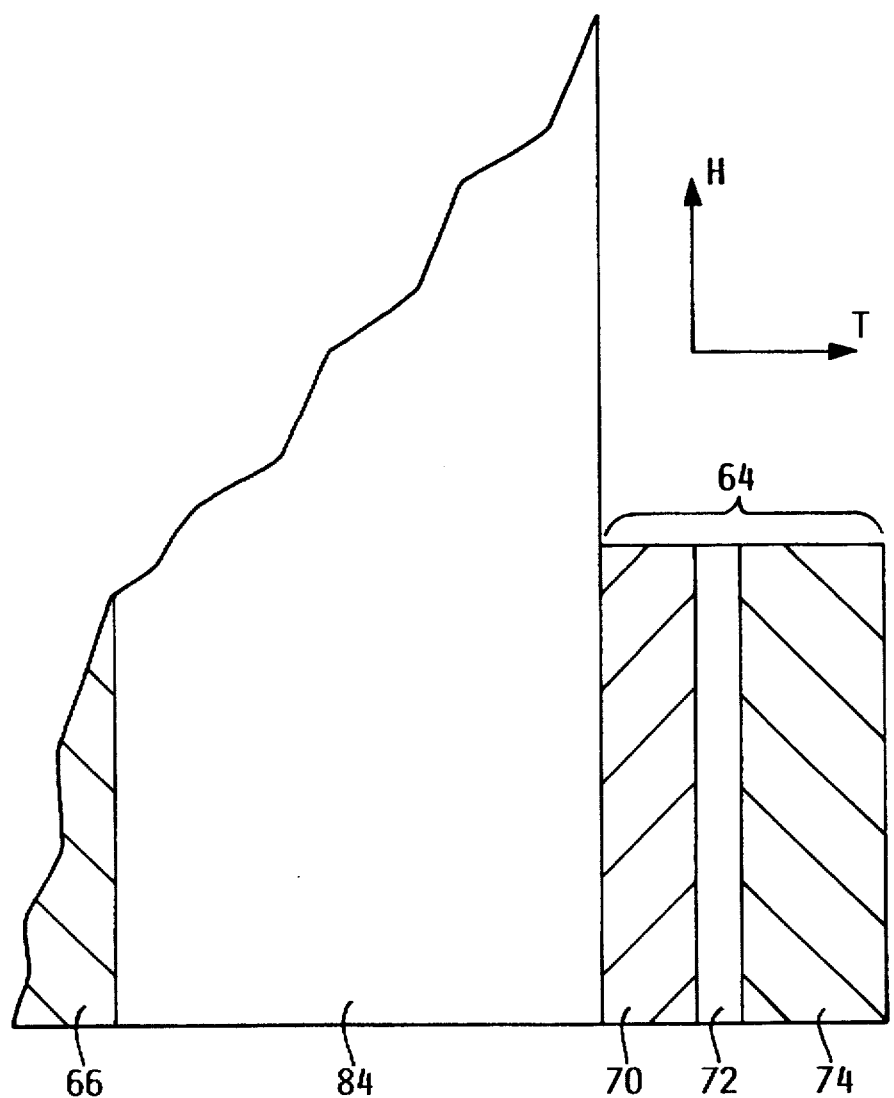
FIG. 7 is a sectional view of the MR head of the first embodiment of the present invention along line VII—VII in FIG. 6 and shows an MR element having a tri-layered structure.

With reference to FIGS. 5, 6 and 7, there is shown a first embodiment of a magnetoresistive "MR" head according to the present invention, generally designated by the reference numeral 60. FIG. 5 is a bottom view of MR head 60, and FIG. 6 is a sectional view thereof along line VI—VI in FIG. 5. FIG. 7 is a sectional view of MR head 60 along line VII—VII in FIG. 6.

The MR head 60 writes bits to and reads bits from a track of a magnetic medium 62 moving relative to MR head 60. The track may be associated with a rotating magnetic disk, a magnetic tape or any other magnetic medium.

The MR head 60 is fabricated using conventional vacuum deposition techniques, such as chemical vapor deposition, ion vapor deposition and sputtering, and electroless plating and electroplating techniques. Such fabrication techniques are generically referred to herein as deposition.

The MR head 60 includes an MR element 64 sandwiched between a magnetic shield layer 66 and a magnetic shield/write pole layer 68. Preferably, as shown in FIG. 7, the MR element 64 has a tri-layered structure, i.e., a soft adjacent layer 70, an intermediate film 72 deposited on soft adjacent layer 70, and an MR film 74 deposited on intermediate film 72. The soft adjacent layer 70 is made of a soft magnetic material such as PERMALLOY, CoZrMo and the like. The intermediate film 72 is made of a nonmagnetic material such as Ti, $SiO_2$ and the like. The MR film 74 is made of a magnetoresistive material such as NiFe.

The MR film 74 is preferably 0.005 to 0.03 microns thick in direction T. The MR film 74 may be 0.03 microns thick, for example, while the intermediate layer 72 and the soft adjacent layer 70 are respectively 0.01 and 0.02 microns thick. Though exemplified as a tri-layered structure, MR element 64 may have any other conventional structure that includes MR film 74.

As best seen in FIG. 6, MR film 74 has a bottom edge 76 to be positioned adjacent to magnetic medium 62, a right side (as viewed in FIG. 6) with an outside edge 78 that is substantially perpendicular to bottom edge 76, a left side (as viewed in FIG. 6) with an outside edge 80 extending in a direction that forms an obtuse angle with bottom edge 76, and a top edge 82 that is substantially parallel to bottom edge 76. As used herein, the terminology "obtuse angle" refers to an angle that is greater than 90 degrees and less than 180 degrees. Preferably, the obtuse angle formed between outside edge 80 and bottom edge 76 is about 135 degrees.

The obtuse angle between outside edge 80 and bottom edge 76 of MR film 74 allows magnetic flux to propagate all the way to top edge 82 without being stopped by outside edge 80, regardless of where the magnetic flux enters along bottom edge 76. As a result, the read sensitivity profile is improved as compared to that of the conventional MR head 20.

Though only MR film 74 is shown in FIG. 6, the other two layers of MR element 64 preferably have the same size and shape as MR film 74. Preferably, each of the three layers of MR element 64 is 0.3 to 4 microns wide in direction W along the bottom edge and is 0.3 to 3 microns high in direction H.

The three layers of MR element 64 are successively deposited upon an insulating layer 84, which is deposited upon magnetic shield layer 66. Magnetic shield layer 66 is made of a magnetically soft and physically hard material, such as CoHfNb, and is approximately 0.5 to 2.5 microns thick in direction T. Magnetic shield/write pole layer 68 is made of PERMALLOY or other suitable material and is approximately 0.5 to 3.5 microns thick in direction T.

A hard bias magnet layer 86 is deposited on insulating layer 84 to abut against outside edge 78 of MR film 74. A hard bias magnet layer 88 is deposited on insulating layer 84 to abut against outside edge 80 of MR film 74. Hard bias magnet layers 86 and 88 are made of an electrically conductive and magnetically hard material such as a cobalt alloy, e.g., CoPtCr. Preferably, hard bias magnet layers 86 and 88 have a thickness in direction T and a height in direction H about equal to those of MR element 64, and abut against the outside edges MR element 64. Also preferably, hard bias magnet layers 86 and 88 have about the same electrical conductivity as MR element 64, so that current flow is not significantly disturbed by the interface therebetween. Hard bias magnet layers 86 and 88 provide longitudinal magnetic biasing of MR film 74 of MR element 64 respectively represented by vectors 87 and 89 pointing to the left in FIG. 6. Longitudinal magnetic biasing of MR film 74 may alternatively be provided by a single hard bias magnet.

A lead layer 90 is deposited on hard bias magnet layer 86 and insulating layer 84. Similarly, a lead layer 92 is deposited on hard bias magnet layer 88 and insulating layer 84. Lead layers 90 and 92 are electrically connected to MR film 74 through hard bias magnet layers 86 and 88, respectively. Thus when a bias current is driven through MR film 74 by lead layers 90 and 92, magnetic flux flows in a circle around and through MR film 74 and the soft adjacent layer 70 of MR element 64, thereby providing transverse magnetic biasing in MR film 74. Although not shown, the transverse magnetic biasing is pointed downward in FIG. 6.

A net bias angle of the magnetization of MR film 74, i.e., the sum of the longitudinal and transverse magnetic biasing, is represented in FIG. 6 as a series of vectors B pointing downward and to the left. The magnetic flux from magnetic medium 62 is represented in FIG. 6 by a series of vectors and lines F which initially point upward until entering MR film 74 and then point upward and to the left. As shown in FIG. 6, even though the magnetic flux from magnetic medium 62 propagates within MR film 74 generally in a direction that is perpendicular to the net bias angle, the obtuse angle between outside edge 80 and bottom edge 76 of MR film 74 allows magnetic flux to propagate all the way to top edge 82 without being stopped by outside edge 80, regardless of where the magnetic flux enters along bottom edge 76.

Lead layer 90 has a side edge that faces MR element 64 and that is coextensive with outside edge 78 of MR film 74, and is thus substantially perpendicular to the bottom edge 76 of MR film 74. Lead layer 92 has a side edge 93 that faces MR element 64 and that is substantially perpendicular to the bottom edge 76 of MR film 74. By so arranging the side edges of lead layers 90 and 92, nearly uniform current flow is maintained even though outside edge 80 of MR film 74 forms a large obtuse angle with bottom edge 76. Side edges of lead layers 90 and 92 may be angled slightly, however, to adjust the direction of current flow to counteract current flow nonuniformity caused by the finite resistance of lead layers 90 and 92 and any current flow disturbance caused by the angular interface between hard bias magnet layer 88 and MR film 74.

An insulating layer 94 is deposited on MR element 64, lead layers 90 and 92, and insulating layer 84. Magnetic shield/write pole layer 68 is deposited on insulating layer 94. The spacing between magnetic shield layer 66 and magnetic shield/write pole layer 68 is preferably 0.1 to 1 micron in direction T, with MR element 64 being about midway therebetween.

Preferably, the thickness of each of lead layers 90 and 92 is less than 0.1 microns. Lead layers 90 and 92 are made of a material, such as Ta, W and the like, that provides a good compromise between resistivity, corrosion resistance and lapping behavior.

An insulating layer 96 is deposited on magnetic shield/write pole layer 68, and a write pole layer 98 is deposited on insulating layer 96. Insulating layers 84, 94 and 96 may be made of insulating materials such as $Al_2O_3$, $SiO_2$ and the like. Insulating layer 96 forms a write gap between magnetic shield/write pole layer 68 and write pole layer 98, and is preferably 0.3 to 0.6 microns thick in direction T.

The write pole layer 98 is made of PERMALLOY, for example, and is preferably 0.5 to 4 microns thick in direction T and 0.5 to 6 microns wide in direction W. The center line of write pole layer 98 is preferably offset from the center line of MR element 64 to compensate for the skew of a rotary actuator, for example. Also, the write pole layer 98 is preferably wider than MR element 64, so that MR head 60 is of the write wide/read narrow type.

A disadvantage of the first embodiment is that the width of the read sensitivity varies significantly with the height of MR film 74 due the obtuse angle of outside edge 80 and variability of lapping height. The variability of lapping height is caused by the lapping tolerance introduced by a lapping process used to form the active surface of MR head 60, which includes bottom edge 76 of MR film 74, after the various layers are deposited. The width of the bottom edge 76 of MR film 74 varies with the lapping height, thereby changing the read sensitivity. Moreover, the side-to-side magnetic center of MR film 74 varies with the lapping height because of the obtuse angle, which can degrade the read sensitivity profile. For example, the magnetic center of MR film 74 moves disadvantageously to the right (as viewed in FIG. 6) as the lapping height becomes smaller (i.e., as the height of MR film 74 becomes larger).

Figure 8:
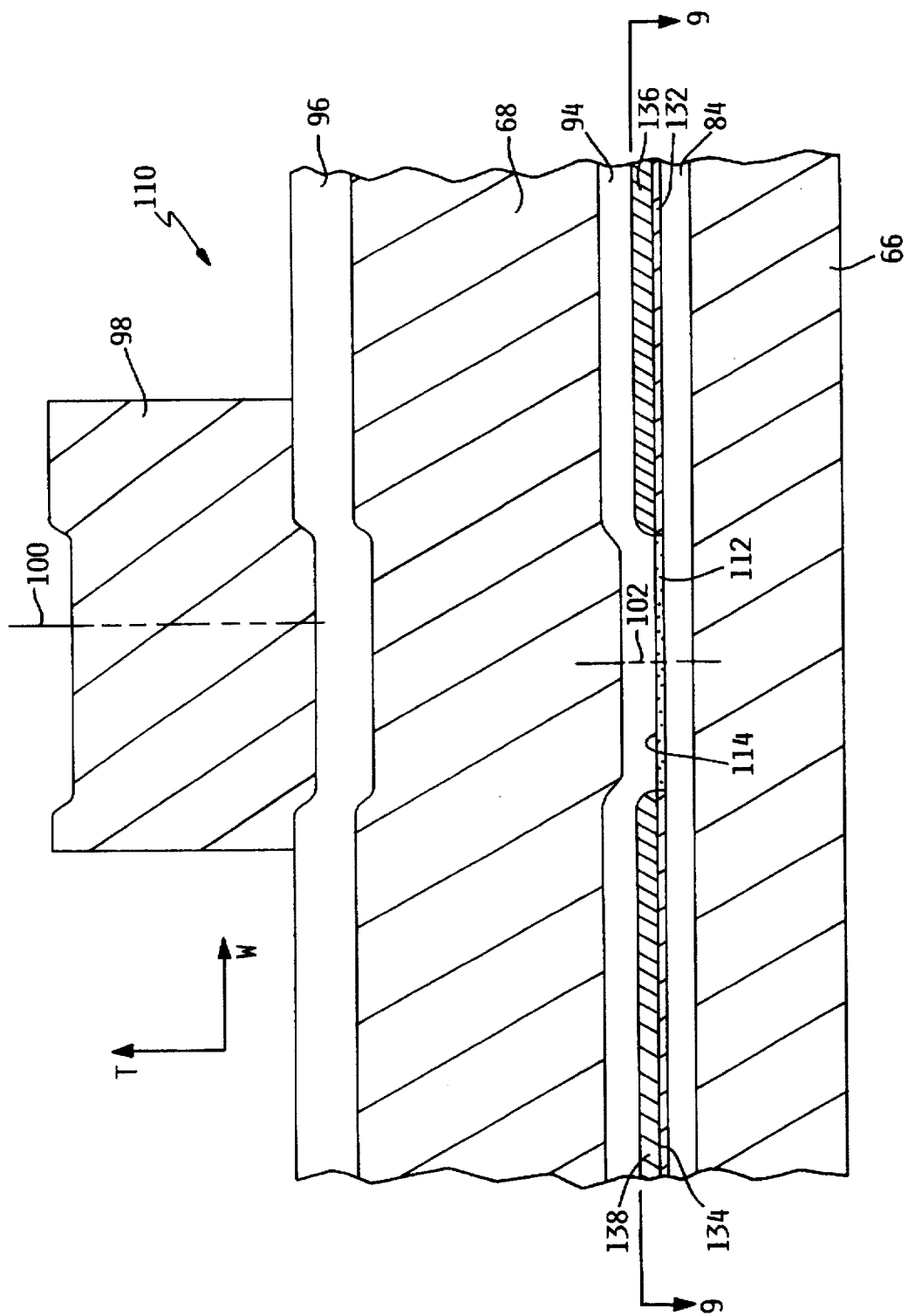
FIG. 8 is a bottom view of an MR head according to a second embodiment of the present invention.
Figure 9:
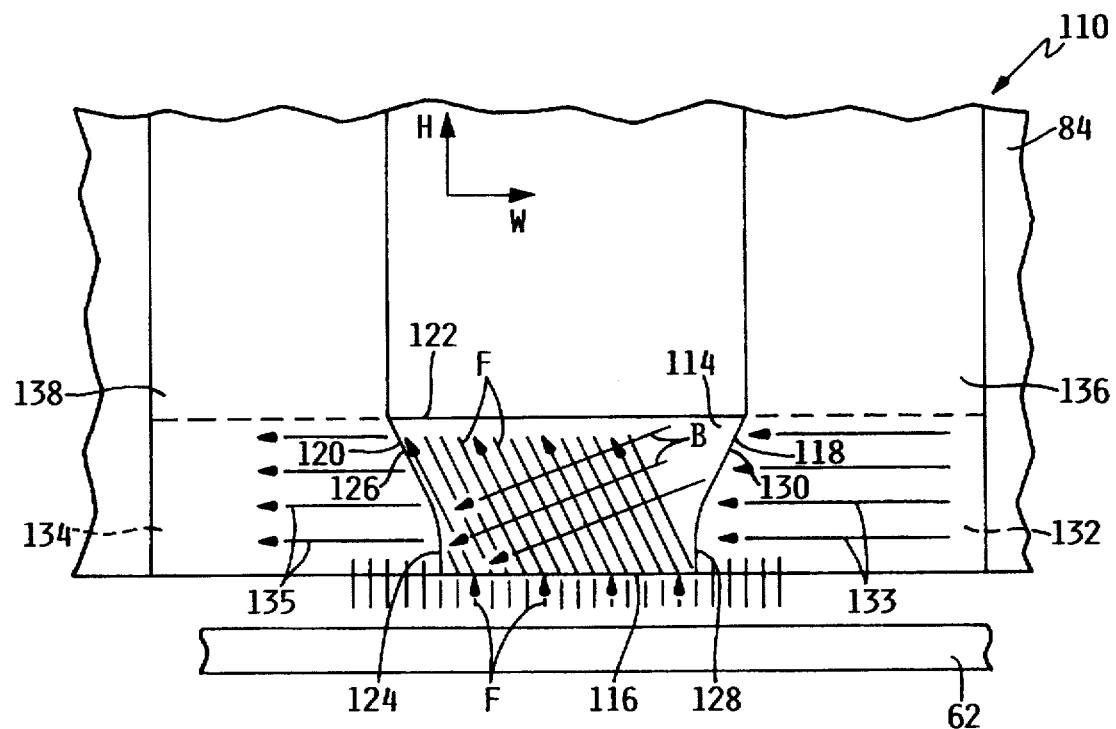
FIG. 9 is a sectional view of the MR head of the second embodiment of the present invention along line IX—IX in FIG. 8.

This disadvantage is overcome by a second embodiment of an MR head according to the present invention shown in FIGS. 8 and 9, generally designated with the reference numeral 110. FIG. 8 is a bottom view of MR head 110, and FIG. 9 is a sectional view thereof along line IX—IX in FIG. 8.

The second embodiment is identical to the first embodiment, except for the shapes of the MR element, hard bias layers and lead layers. In FIGS. 8 and 9, the same reference numerals are used to denote elements of the second embodiment that are identical to element of the first embodiment. Consequently, the description of the structure of these identical elements and the fabrication techniques used to make them is not repeated with respect to the second embodiment.

In the second embodiment, an MR element 112 is identical to MR element 64 of the first embodiment, except in shape. The MR element 112 has a tri-layered structure, i.e., a soft adjacent layer, an intermediate film deposited on the soft adjacent layer, and an MR film 114 deposited on the intermediate film.

As best seen in FIG. 9, the MR film 114 has a bottom edge 116 to be positioned adjacent to magnetic medium 62, a right side (as viewed in FIG. 9) with an outside edge 118, a left side (as viewed in FIG. 9) with an outside edge 120, and a top edge 122 that is substantially parallel to bottom edge 116. Outside edge 120 includes a lower portion 124 substantially perpendicular to bottom edge 116 and an upper portion 126 extending in a direction that forms an obtuse angle with bottom edge 116. Likewise, the outside edge 118 preferably includes a lower portion 128 substantially perpendicular to bottom edge 116 and an upper portion 130 extending in a direction that forms an obtuse angle with bottom edge 116. Preferably, each of these obtuse angles is about 135 degrees. Also preferably, lower portion 124 and 128 have a height in direction H which is less than that of upper portions 126 and 130, this height corresponding to the maximum lapping height.

Because upper portion 126 extends in a direction that forms an obtuse angle with bottom edge 116, the read sensitivity profile is improved as compared to that of the conventional MR head 20 since more magnetic flux is allowed to propagate all the way to top edge 122 without being stopped by outside edge 120. Moreover, because lower portions 124 and 128 are each perpendicular bottom edge 116, the read sensitivity width and offset does not vary significantly due to variability of lapping height. The width of bottom edge 116 does not change with the lapping height. Likewise, the side-to-side magnetic center of MR film 114 does not vary with the lapping height.

In addition, because upper portion 130 extends in a direction that forms an obtuse angle with bottom edge 116, the read sensitivity profile is improved still further as compared to that of the conventional MR head 20 since more magnetic flux is allowed to propagate all the way to top edge 122 without being stopped by outside edge 118. That is, a small portion of the magnetic flux spreads away from the nomimal path as it moves toward top edge 122, and would otherwise be stopped by outside edge 118.

The soft adjacent layer and the intermediate film of MR element 112 preferably have the same size and shape as MR film 114. Preferably, each of the three layers of MR element 112 is 0.3 to 4 microns wide in direction W along the bottom edge and is 0.3 to 3 microns high in direction H. Also preferably, MR element 112 has a center line 102 that is offset from a center line 100 of write pole layer 98 to compensate for a skew in a rotary actuator, for example. The three layers of MR element 64 are successively deposited upon insulating layer 84.

Though exemplified as a tri-layered structure, MR element 112 may have any other conventional structure that includes MR film 114.

A hard bias magnet layer 132 is deposited on insulating layer 84 to abut against outside edge 118 of MR film 114, both in the lower portion 128 and the upper portion 130. A hard bias magnet layer 134 is deposited on insulating layer 84 to abut against outside edge 120 of MR film 114, both in the lower portion 124 and the upper portion 126. Hard bias magnet layers 132 and 134 are identical to hard bias magnet layers 86 and 88 of the first embodiment, except in shape. Hard bias magnet layers 132 and 134 provide longitudinal magnetic biasing of MR film 114 of MR element 112 respectively represented by vectors 133 and 135 pointing to the left in FIG. 9. Longitudinal magnetic biasing of MR film 114 may alternatively be provided by a single hard bias magnet or by any other conventional biasing technique, such as exchange biasing.

A lead layer 136 is deposited on hard bias magnet layer 132 and insulating layer 84. Similarly, a lead layer 138 is deposited on hard bias magnet layer 134 and insulating layer 84. Lead layers 136 and 138 are identical to lead layers 90 and 92 in the first embodiment, except for shape. Lead layers 136 and 138 are electrically connected to MR film 114 through hard bias magnet layers 132 and 134, respectively. Thus when a bias current is driven through MR film 114 by lead layers 136 and 138, magnetic flux flows in a loop around and through MR film 114 and the soft adjacent layer of MR element 112, thereby providing transverse magnetic biasing in MR film 114. Although not shown, the transverse magnetic biasing is pointed downward in FIG. 9.

A net bias angle of the magnetization of MR film 114, i.e., the sum of the longitudinal and transverse magnetic biasing, is represented in FIG. 9 as a series of vectors B pointing downward and to the left. The magnetic flux from magnetic medium 62 is represented in FIG. 9 by a series of vectors and lines F which initially point upward until entering MR film 114 and then point upward and to the left. As shown in FIG. 9, even though the magnetic flux from magnetic medium 62 propagates within MR film 114 generally in a direction that is perpendicular to the net bias angle, the orientation of upper portion 126 allows a larger part magnetic flux to propagate all the way to top edge 122 without being stopped by outside edge 120. In addition, a small portion of the magnetic flux that spreads away from the nominal direction as it moves toward top edge 122 is less likely to be stopped by outside edges 118 and 120 because of the orientation of upper portions 130 and 126 thereof.

Lead layer 136 has a side edge that faces MR element 112 and that is coextensive with outside edge 118 of MR film 114. Lead layer 138 has a side edge that faces MR element 112 and that is coextensive with outside edge 120 of MR film 114. By so arranging the side edges of lead layers 136 and 138, current density symmetry is maintained. Moreover, there is no need for an additional masking step to separate the side edges of lead layers 136 and 138 from the side edges of the hard bias magnet layers 132 and 134.

Figure 10:
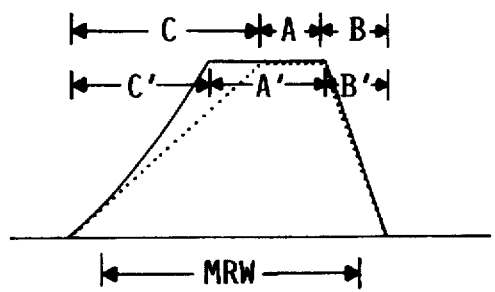
FIG. 10 is a graph that shows a trapezoidal-fit of the read sensitivity profile for the MR head of the second embodiment of the present invention as a solid line and the trapezoidal-fit of the read sensitivity profile for the conventional MR head of FIGS. 1 and 2 as a dotted line.

FIG. 10 is a graph that shows the trapezoidal-fit of the read sensitivity profile for MR head 110 as a solid line and the trapezoidal-fit of the read sensitivity profile for the conventional MR head 20 as a dotted line. In FIG. 10, read sensitivity is plotted versus position along the width (MRW) of the respective MR film, which is the width of bottom edge 116 in the case of MR film 114. As in FIG. 3, the total width across the trapezoidal-fit of the read sensitivity profile for the conventional MR head 20 is divided into flat top region A, right slant region B and left slant region C. Also in FIG. 10, the total width across the trapezoidal-fit of the read sensitivity profile for MR head 110 is divided into a flat top region A', a right slant region B' and a left slant region C'.

The width of left slant region C' of MR head 110 is about 30% smaller than the width of left slant region C of the conventional MR head 20, and has a much steeper slope. There is not much change on the left most part (as viewed in FIG. 10) of left slant region C' of MR head 110, since that part corresponds to the lower portion 124 of outside edge 120 of MR film 114. The remaining part of the left slant region C' of MR head 110, however, rises very rapidly, since that part corresponds to the upper portion 126 of outside edge 120 of MR film 114.

Also, the width of right slant region B' of MR head 110 is slightly smaller than the width of right slant region B of the conventional MR head 20, and also has a slightly steeper slope. The width of flat top region A' of MR head 110, which is a region of uniform sensitivity, is about 90% larger than the width of flat top region A of the conventional MR head 20. The total (integral) read sensitivity of MR head 110 is higher than that of the conventional MR head 20 because the larger width of flat top region A produces more signal.

Thus the read sensitivity profile of MR head 110 is closer to ideal than that of the conventional MR head 20. Ideally, the right and left slant regions are nearly vertical, and the flat top region is wide.

Accordingly, when MR head 110 is used to read data from a track recorded on the magnetic medium, the on-track signal can be increased without increasing the interference from an adjacent track as compared to the conventional MR head 20. Likewise, when MR head 110 is used in sector servo applications, a more uniform position error signal (PES) is maintained as compared to the conventional MR head 20.

Figure 11:
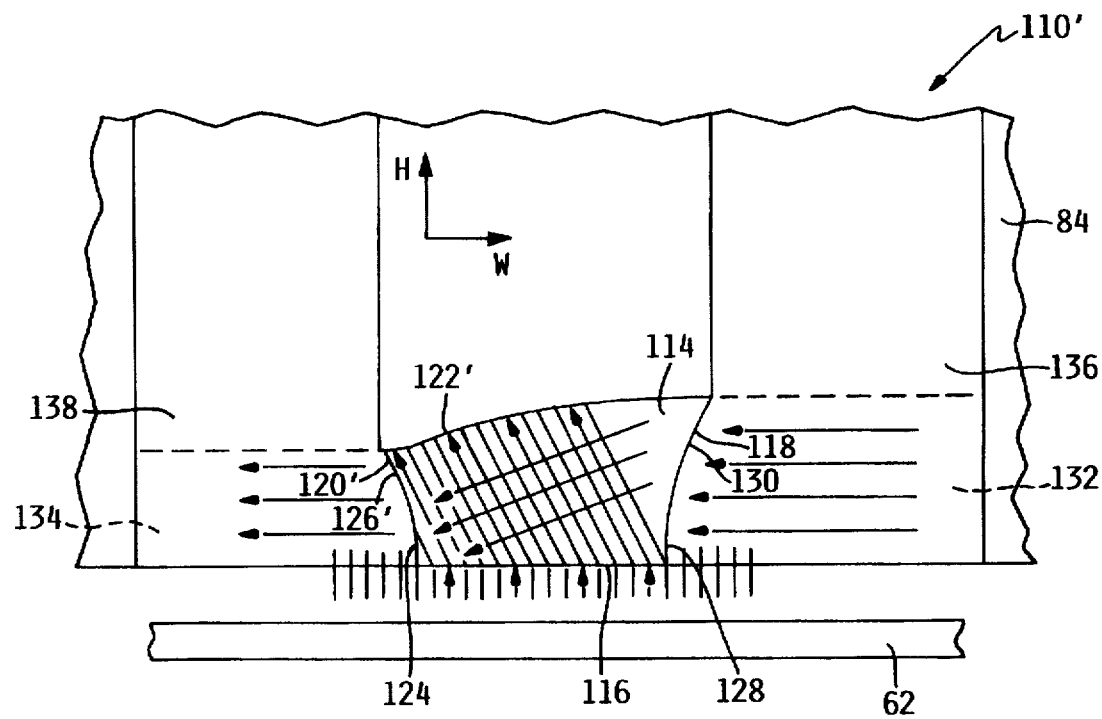
FIG. 11 is a sectional view of an MR head according to a modified version of the second embodiment of the present invention along line IX—IX in FIG. 8.

FIG. 11 is a sectional view of an MR head 110' according to a modified version of the second embodiment along line IX—IX in FIG. 8. In this modification, top edge 122' of MR film 114 is shaped such that the height in direction H between top edge 122' and bottom edge 116 narrows from outside edge 118 to outside edge 120'. For example, as shown in FIG. 11, top edge 122' of MR film 114 may curve toward bottom edge 116 near outside edge 120'. Thus, the height of outside edge 120' is less than that of outside edge 118. The side edge of hard bias magnet layer 134 that abuts against outside edge 120' of MR film 114 is shorter than the side edge of hard bias magnet layer 132 that abuts against outside edge 118 of MR film 114. Likewise, the side edge of lead layer 138 that is coextensive with the outside edge 120' of MR film 114 is shorter than the side edge of lead layer 136 that is coextensive with the outside edge 118 of MR film 114. Because the height of MR film 114 narrows from the right side (as viewed in FIG. 11) to the left side, there is more electrical resistance per unit length on the left side of MR film 114 than on the right side, and thus the voltage drop on the left side of MR film 114 is more than on the right side. As a result, the left side of MR film 114 is more sensitive to magnetic flux relative to the right side, thereby making the read sensitivity profile even more symmetrical.

Figure 12:
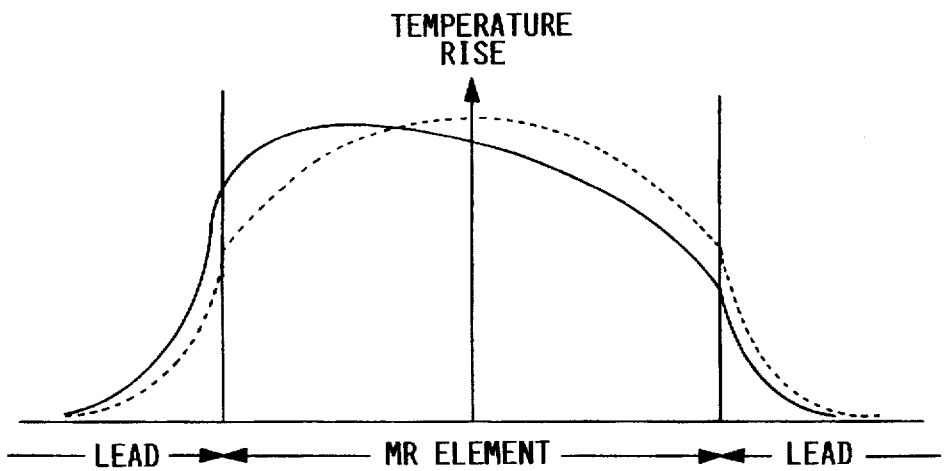
FIG. 12 is a graph that shows the temperature profile of the MR head of FIG. 11 as a solid line and the temperature profile of the conventional MR head of FIGS. 1 and 2 as a dotted line.

FIG. 12 is a graph that shows the temperature profile of MR head 110' as a solid line and the temperature profile of the conventional MR head 20 as a dotted line. Heat builds up on the left side of MR film 114 of MR head 110' due to the greater electrical resistance on the left side, but is quickly dissipated by hard bias magnet layer 134 and lead layer 138. Excessive heat buildup in an MR film reduces its useful life. As shown in FIG. 12 the heat buildup in MR film 114 of MR head 110' is no greater than that in the conventional MR head 20.

Figure 13:
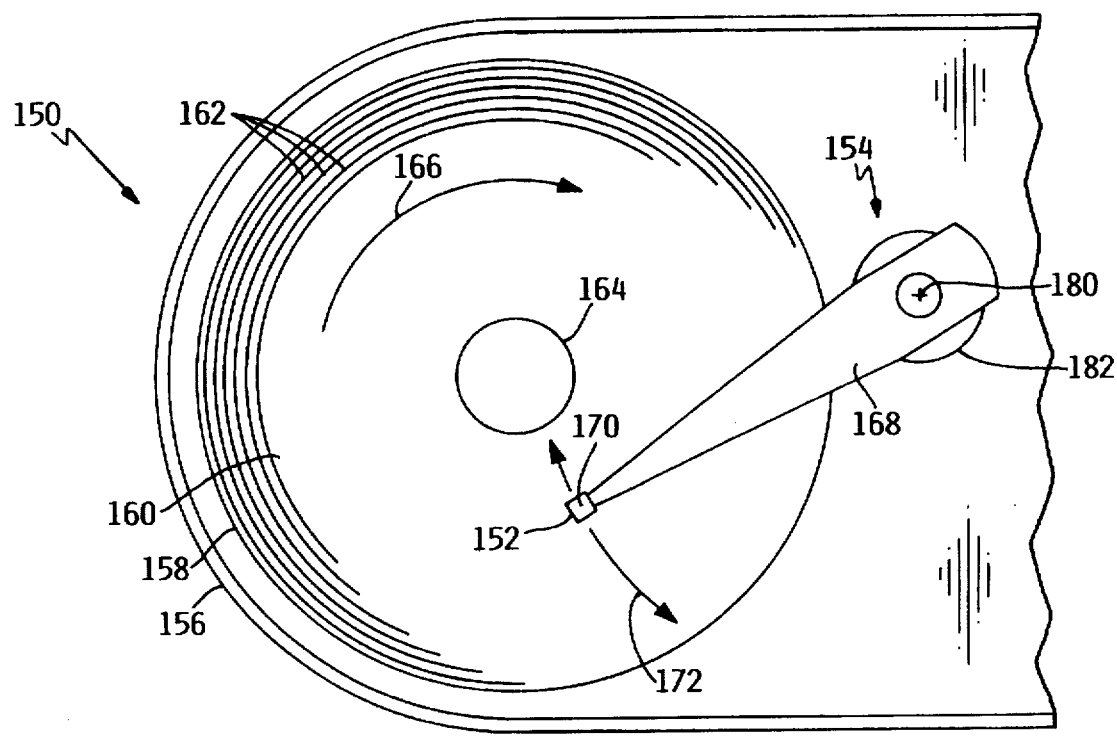
FIG. 13 is a top plan view of a direct access storage device incorporating an MR head according to the present invention.

FIG. 13 is a top plan view of a direct access storage device (DASD) 150, i.e., a magnetic disk drive unit, employing a plurality of MR heads according to the present invention (only one MR head 152 is shown, which represents any of the above described MR heads 60, 110 and 110'). The direct access storage device 150 includes a rotary actuator assembly 154 and a housing 156, which encloses a stack of disks 158 (only one disk is shown) having opposed magnetic surfaces 160 (only one surface is shown). Disks 158 have numerous information tracks 162 arranged in a concentric pattern on the magnetic surfaces 160. The disks 158 are mounted in parallel for simultaneous rotation by an integral spindle and motor assembly 164. A disk controller (not shown) operatively controls the integrated spindle and motor assembly 164 for rotating the disks 158, for example, at a substantially constant velocity in a clockwise (CW) direction, as indicated by an arrow 166 in FIG. 13.

Rotary actuator assembly 154 includes a plurality of arms 168 (only one arm is shown), each supporting at least one slider 170 relative to a corresponding disk surface 160. Each slider 170 incudes an air bearing surface (not shown) and has at least one MR head 152 mounted to a side surface. Support arms 168 are driven rotatably and bidirectionally by an actuator driver (not shown) for moving MR heads 152 in an arc from one track 162 to another track 162 as indicated by an arrow 172 in FIG. 13. Support arms 168 are mounted on a pivot 180 defining an axis of rotation for MR heads 152. Pivot 180 can include a bearing cartridge 182 for simultaneous positioning of MR heads 152 adjacent to disk surfaces 160.

While several embodiments of the present invention have been shown and described, other variations will be readily apparent to those skilled in the art. Therefore, the present invention is not limited to these embodiments but is intended to cover all such variations as fall within the scope of the present invention defined by the claims that follow.

What is claimed is:

1. A magnetoresistive head, comprising:

an insulation layer:

a magnetoresistive film provided over said insulation layer, said magnetoresistive film having a bottom edge to be positioned adjacent to a magnetic medium, and first side with a first outside edge, and a second side with a second outside edge, said first outside edge having a lower portion substantially perpendicular to said bottom edge and an upper portion extending in a direction that forms an obtuse angle with said bottom edge so that said magnetoresistive film narrows toward said bottom edge, wherein said magnetoresistive film has a top edge opposite said bottom edge, and a height between said bottom and top edges measured in a direction perpendicular to said bottom edge narrowing from said second outside edge to said first outside edges a first lead layer provided over said insulation layer and electrically connected to said magnetoresistive film at said first outside edge; and a second lead layer provided over said insulation layer and electrically connected to said magnetoresistive film at said second outside edge.

2. A magnetoresistive head as recited in claim 1, wherein said second outside edge of said magnetoresistive film has a lower portion substantially perpendicular to said bottom edge and an upper portion extending in a direction that forms an obtuse angle with said bottom edge.

3. A magnetoresistive head as recited in claim 2, wherein said lower portion of said first outside edge of said magnetoresistive film has a height measured in a direction perpendicular to said bottom edge that is less than that of said upper portion of said first outside edge.

4. A magnetoresistive head as recited in claim 1, further comprising:

a first hard bias magnet layer having a side edge abutting against said first outside edge of said magnetoresistive film, a portion of said first hard bias magnet layer being sandwiched between said insulation layer and said first lead layer.

5. A magnetoresistive head as recited in claim 4, wherein said first lead layer has a side edge facing said magnetoresistive film and substantially coextensive with said side edge of said first hard bias magnet layer.

6. A magnetoresistive head as recited in claim 5, wherein said second outside edge of said magnetoresistive film has a lower portion substantially perpendicular to said lower edge and an upper portion extending in a direction that forms an obtuse angle with said bottom edge.

7. A magnetoresistive head as recited in claim 6, further comprising:

a second hard bias magnet layer having a side edge abutting said second side of said magnetoresistive film, a portion of said second hard bias magnet layer being sandwiched between said insulation layer and said second lead layer.

8. A magnetoresistive head as recited in claim 7, wherein said second lead layer has a side edge facing said magnetoresistive film and substantially coextensive with said side edge of said second hard bias magnet layer.

9. A magnetoresistive head as recited in claim 1, wherein a portion of said top edge of said magnetoresistive film is curved.

10. A magnetoresistive head as recited in claim 1, wherein said obtuse interior angle is about 135 degrees.

11. A method of fabricating a magnetoresistive head, comprising the steps of:

(a) forming a magnetoresistive film over a first portion of an insulation layer so that said magnetoresistive film has a bottom edge to be positioned adjacent to a magnetic medium, and a first side with a first outside edge, and second side with a second outside edge, wherein said first outside edge has a first portion substantially perpendicular to said bottom edge and a second portion extending in a direction that forms an obtuse angle with said bottom edge so that said magnetoresistive film narrows toward said bottom edge, wherein step (a) includes the substep of forming said magnetoresistive film to have a top edge opposite said bottom edge, and a height between said bottom and top edges measured in a direction perpendicular to said bottom edge narrowing from said second outside edge to said first outside edge;

(b) depositing a first hard bias magnet layer over a second portion of said insulation layer so that a side edge of said first hard bias magnet layer abuts against said first outside edge of said magnetoresistive film;

(c) depositing a first lead layer over said first hard bias magnet layer so that said first lead layer is electrically connected to said magnetoresistive film through said first hard bias magnet layer;

(d) depositing a second hard bias magnet layer over a third portion of said insulation layer so that a side edge of said second hard bias magnet layer abuts against said second outside edge of said magnetoresistive film; and (e) depositing a second lead layer over a said second hard bias magnet layer so that said second lead layer is electrically connected to magnetoresistive film through said second hard bias magnet layer.

12. A method of fabricating a magnetoresistive head as recited in claim 11, wherein step (a) includes the substep of forming said magnetoresistive film so that said obtuse interior angle is about 135 degrees.

13. A direct access storage device, comprising:

a housing;

at least one disk mounted in said housing for rotation about an axis;

a plurality of tracks for storing data on at least one surface of said disk, said tracks being arrayed in a pattern around said axis;

a magnetoresistive head, said magnetoresistive head having an insulation layer, a magnetoresistive film provided over said insulation layer, said magnetoresistive film having a bottom edge to be positioned adjacent to a magnetic medium, and a first side with a first outside edge, and a second side with a second outside edge, said first outside edge having a lower portion substantially perpendicular to said bottom edge and an upper portion extending in a direction that forms an obtuse angle with said bottom edge so that said magnetoresistive film narrows toward said bottom edge, wherein said magnetoresistive film has a top edge opposite said bottom edge, and a height between said bottom and top edges measured in a direction perpendicular to said bottom edge narrowing from said second outside edge to said first outside edge, a first lead layer provided over said insulation layer and electrically connected to said magnetoresistive film at said first outside edge, and a second lead layer provided over said insulation layer and electrically connected to said magnetoresistive film at said second outside edge, and an actuator operatively connected to said magnetoresistive head for moving said magnetoresistive head relative to said surface of said disk.

14. A direct access storage device as recited in claim 13, wherein said obtuse interior angle is about 135 degrees.

* * * * *